Patented Dec. 28, 1948

2,457,591

UNITED STATES PATENT OFFICE 2,457,591

HYDROPHILIC-ORGANOPHILIC PIGMENTS AND METHODS FOR PRODUCING SAME

Maryalice Conley Moore, Wilmington, Del., assignor to E. I. du Pont de Nemours & Company, Wilmington, Del., a corporation of Delaware No Drawing. Application January 12, 1946, Serial No. 640,989

10 Claims. (Cl. 106—308)

This invention relates to the surface treatment of pigments and pigmentary materials and more particularly to the production of such products having novel properties for use in either aqueous or non-aqueous media.

The modification of the surface characteristics of pigments, pigment extenders and fillers for use in paints and other compositions has received considerable attention by prior investigators and a number of patents along this line have been issued. The use of minor amounts of organic materials as well as inorganic salts has been proposed and substantial changes in the properties of the pigments have been effected. In general, the coating of the pigment particles with organic compounds improves the working properties of the pigment in non-aqueous systems and the use of inorganic salts such as sodium pyrophosphate improves the dispersibility in aqueous media. The prior art treatments thus provide improved hydrophilic properties in some instances and improved organophilic in other instances, but in no case has the treatment resulted in a product showing improved working properties in both aqueous and non-aqueous systems.

Accordingly, an object of this invention is to overcome the limitation of prior art treatments and to prepare by a simple treatment pigments and pigmentary materials which are both hydrophilic and organophilic in character. A further object is to provide a simple process by which a pigment material is surface-treated with an organic material having an affinity for both aqueous and non-aqueous liquids. A still further object is the combination of a surface treatment and a grinding operation by which the pigment surface is modified to give the aforementioned property.

The above and other objects are attained by the following invention which broadly comprises subjecting a mixture of a pigment or a pigmentary substance and a minor amount of an amino-nitrile compound to an intimate mixing operation and at elevated temperature to polymerize the amino-nitrile compound.

A preferred embodiment of my invention comprises the addition of a small amount of an omega-amino-nitrile compound to a pigmentary material after which it is intimately incorporated therein and heated to an elevated temperature in an atmosphere of superheated steam conducive to polymerization of the nitrile compound thereby producing a finely-divided pigment having a polymeric compound distributed over the surface of the particles.

A specific embodiment of my invention comprises the addition of omega-amino-capro-nitrile to titanium dioxide pigment prior to its being ground in a jet pulverizer or fluid-energy-mill such as that described in U. S. Patent 2,032,827 and further described in Perry's Chemical Engineering Handbook (1941 edition) page 1930. The energy in such a mill is supplied by a gas under high pressure which is admitted to a shallow circular grinding chamber along with the solid material which is to be reduced in size. The particles are reduced in size by being forced against each other and against the surface of the chamber by the circular movement of the gases, the rapidly moving streams of gases being admitted continuously into the chamber through orifices placed in a tangential position so that the entering gas will promote the rotation of the material to be pulverized in the same direction. In the practice of my process this gaseous energy may be supplied by steam at a pressure of 100 pounds or more which has been superheated to a temperature of over 400° F. This high pressure, superheated steam not only acts to subdivide the pigment in this instance, but also acts to effect polymerization of the nitrile compound.

The omega-amino-capro-nitrile compound preferred for use herein is manufactured in considerable quantity from derivatives of cyclohexane by a process which involves breaking of the ring and reaction with nitrogen compounds. The water-soluble homologues of the capronitrile are also contemplated as being useful in this invention, and accordingly are considered equivalents of the capro-nitrile. The omega-amino-capro-nitrile appears as a liquid and may be polymerized by heating under such conditions as are encountered in the above-mentioned fluid-energy-milling operation using superheated steam. The use of such a compound, therefore, permits one to grind the pigment and at the same time surface modify the particles such that the behavior in contact with liquids after treatment is quite different from a pigment identically ground except for the addition of the nitrile compound.

Omega-amino-nitrile compounds readily dissolve in water and may be added to the pigment as solutions or may be dissolved in the water in which the pigment is suspended or is about to be suspended. In either case, satisfactory dispersion of the amino-nitrile compound throughout the pigment mass may be effected, and by these methods an adequate distribution of the amino-nitrile on the pigment may be obtained. It is also possible to suspend the pigment in a gas containing vapors of the amino-nitrile after which it is subjected to the elevated temperature of the steam jet pulverizer at which time the amino-nitrile polymerizes and condenses on the finely-ground pigment as it passes through the pulverizer.

As already noted, I contemplate using in my invention all water-soluble amino-nitrile compounds, and particularly omega-amino-nitriles containing not to exceed six carbon atoms. Examples of the latter type of useful compounds include omega - amino - capro - nitrile, omega-amino-butyro - nitrile, omega - amino - valero-nitrile, etc. The amount of the amino-nitrile compound, or mixtures thereof which can be used herein, may be varied within rather wide limits, but since advantageous results accrue herein by coating the individual pigment particles with a relatively thin film and only relatively small amounts of the amino-nitrile compound are required for that purpose, such small or minor amounts are recommended for use. Treatments may vary from .05% to 5% and even to 10% by weight of the pigment, but I prefer to use amounts within the range of .1% and 2%.

Example I

A 4% solution of omega-amino-capro-nitrile was prepared by dissolving the proper amount of the organic compound in water. Dry rutile titanium dioxide pigment was slurried in this solution using four parts by weight of the titanium dioxide for each part by weight of the solution. This heavy suspension was then dried to give a pigment having 1% by weight of omega-amino-capro-nitrile intimately associated with it and the dried pigment was then ground in a fluid-energy-mill using steam as the source of energy. The steam carried a temperature of 600° F. and a pressure of 100 pounds per square inch.

The product of Example I was ground in a 40/60 urea-alkyd vehicle to give a paint and films prepared therefrom showed a gloss superior to untreated controls, a much lower grit content and at the same time exhibited equally satisfactory color. The ease of wetting was determined by mixing 370 grams of the pigment with 146 grams of a commercial alkyd vehicle using a Hankoczy-Brabender Plastograph as described in British Patent 340,297. This instrument consists of a constant temperature paint mixer with a torque balance attached to the shaft connecting the mixer blades and the motor, so that relative resistance to mixing is indicated and recorded during the mixing operation. In these tests, the paint vehicle was first added to the mixing compartment with the mixer running, and the balance adjusted so as to give a zero reading on the scale. The pigment was then added gradually and the scale reading observed while the pigment was being wet by vehicle and after wetting was complete. The pigment of this example gave a resistance reading of 260 grams meters of torque compared to 380 for a similar pigment treated in the same way except that the amino-nitrile compound was omitted.

Water dispersibility was determined by adding 15 grams of the pigment to 5 cc. of water. The treated pigment formed a flowing suspension while an untreated control gave a stiff paste which was poorly wetted by the water.

Example II

A saturated omega-amino-capro-nitrile solution was prepared and was sprayed onto rutile titanium dioxide pigment as it passed through a screw conveyor en route to a fluid-energy-mill. The spray was adjusted to admit one pound of the nitrile compound for each one thousand pounds of $TiO_2$. The steam used in the mill had a temperature of 500° F. and a pressure of 100 pounds per square inch.

The product of this example was tested as in Example I and the plastograph reading showed 280 meters of torque or 100 points better than control. The water dispersibility test also showed that a fluid suspension could be obtained using 15 grams of the pigment with 5 cc. of water showing that the pigment was hydrophilic in this instance while the plastograph showed that the pigment was organophilic by that test.

While the above examples involve the treatment of calcined rutile titanium dioxide under the invention, treatment is also contemplated of all types of pigments, either alone or extended with various extenders, such as those of the alkaline earth metal sulfates of barium, calcium, or with calcium carbonate, etc. Thus, pure or extended titanium dioxide in the anatase modification and zinc pigments such as lithopone or zinc sulphides, as well as colored pigments, can be similarly treated. The process is particularly beneficial in the case of pigments which have been calcined at high temperatures to develop essential pigment properties, such as tinting strength, hiding power, opacity, oil absorption, etc., and therefore applies particularly to the white pigment group comprising titanium dioxide, extended titanium pigments, lithopone and zinc sulphide. Pigments after treatment in accordance with my invention have been found extremely well suited for incorporation in orthodox paints, paint vehicles, water paints, and in other aqueous compositions such as used in the coating of paper. A minimum grinding to incorporate my improved pigments in vehicles regardless of their nature is thus realized and films containing them show excellent gloss without sacrifice in durability and other essential paint properties.

Although temperatures ranging from 500–600° F. and 100 pound pressures have been employed in the examples, I contemplate using temperatures ranging from about 400–1100° F. and pressures of from 50–150 pounds per square inch in effecting polymerization of the amino-nitrile treating agent.

I claim as my invention:

1. A finely-divided pigment the particles of which are coated with from .05% to 10% by weight, based on the pigment of a polymerized water-soluble amide of an organo-amino-alkylnitrile containing not to exceed 6 carbon atoms and possessing improved hydrophilic and improved organophilic properties.

2. A finely-divided pigment the particles of which are coated with from 0.1% to 2%, by weight, based on said pigment of the polymerized amide of omega-amino-capro-nitrile and possessing improved hydrophilic and improved organophilic properties.

3. An improved hydrophilic-organophilic pigment comprising titanium dioxide the particles of which are coated with from 0.1% to 2%, on the $TiO_2$ basis of an omega-amino-capro-nitrile polymer.

4. A process for preparing an improved pigment which comprises mixing a pigment with from about 0.05% to 10% by weight, based on the pigment of a water-soluble omega-amino-alkyl-nitrile containing not to exceed 6 carbon atoms, and then polymerizing said nitrile on said pigment at a pressure ranging from 50–150 pounds per square inch and an elevated temperature ranging from 400–1100° F.

5. A process for the preparation of an improved pigment which comprises mixing said pigment with from 0.05% to 10% by weight, based on the pigment of a solution of a water-soluble omega-amino-alkyl-nitrile containing not to exceed 6 carbon atoms and then subjecting the resulting mixture to pulverization treatment at an elevated temperature ranging from 400–1100° F. and in the presence of steam at a pressure of from 50–150 pounds per square inch to reduce the particle size of said pigment and coat the same with a small amount of a polymer of said nitrile.

6. A process for the preparation of an improved pigment which comprises mixing said pigment with between about 0.05% to 10% by weight, based on said pigment of a water-soluble omega-amino-alkyl-nitrile, and then pulverizing the treated pigment and polymerizing said nitrile at an elevated temperature ranging from 400–1100° F. and in the presence of superheated steam at a pressure of from 50–150 pounds per square inch.

7. A process for the preparation of an improved pigment which comprises incorporating between about 0.1% to 2% by weight, based on the pigment of a water-soluble omega-amino-alkyl-nitrile in said pigment, and then subjecting the resulting product to pulverizing treatment at an elevated temperature ranging from 500–600° F. and in the presence of steam at a pressure of 100 pounds per square inch to reduce the particle size of said pigment and coat the same with a polymer of said nitrile.

8. A process for the preparation of an improved pigment which comprises mixing with said pigment from about 0.05% to 10% by weight, based on the pigment, of omega-amino-capro-nitrile, and pulverizing the resulting product at temperatures ranging from 500–600° C. in the presence of steam at 100 pounds pressure.

9. A process for the preparation of an improved pigment which comprises mixing with said pigment from about 0.1% to 2% by weight, based on the pigment, of omega-amino-capro-nitrile, and pulverizing the resulting product at temperatures ranging from 500–600° C. in the presence of steam at 100 pounds pressure.

10. A process for the preparation of an improved titanium oxide pigment which comprises mixing with said pigment from about 0.1% to 2% by weight, based on the pigment, of omega-amino-capro-nitrile, and pulverizing the resulting product at temperatures ranging from 500–600° C. in the presence of steam at 100 pounds pressure.

MARYALICE CONLEY MOORE.

REFERENCES CITED

The following references are of record in the file of this patent:

UNITED STATES PATENTS

| Number | Name | Date |
| --- | --- | --- |
| 2,205,722 | Graves | June 25, 1940 |
| 2,245,129 | Greenwalt | June 10, 1941 |
| 2,278,878 | Hoff | Apr. 7, 1942 |
| 2,282,006 | Sloan | May 5, 1942 |
| 2,285,009 | Brubaker | June 2, 1942 |
| 2,341,759 | Catlin | Feb. 15, 1944 |